H. H. FREY.
ANTISKIDDING TIRE ATTACHMENT FOR WHEELS.
APPLICATION FILED FEB. 1, 1907.
915,713.
Patented Mar. 16, 1909.
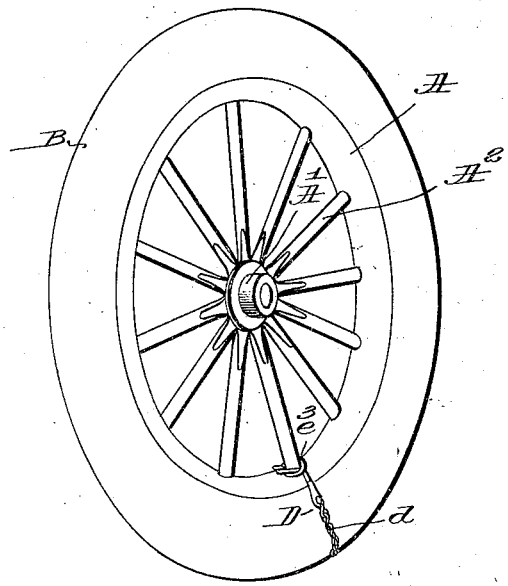
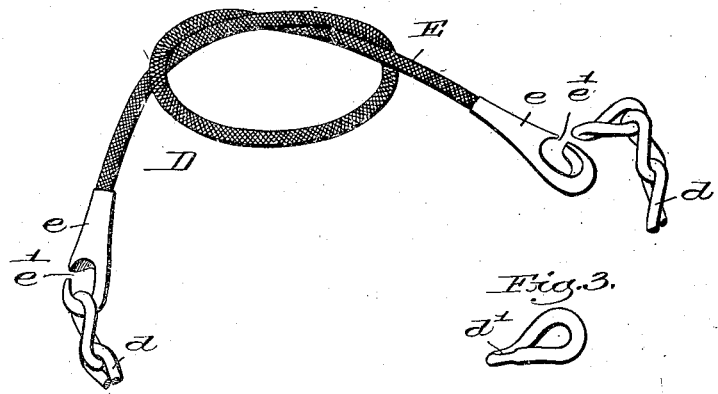

UNITED STATES PATENT OFFICE.

HERBERT H. FREY, OF BOSTON, MASSACHUSETTS, ASSIGNOR TO IVER-JOHNSON SPORTING GOODS COMPANY, A CORPORATION OF MASSACHUSETTS.

ANTISKIDDING TIRE ATTACHMENT FOR WHEELS.

No. 915,713.     Specification of Letters Patent.     Patented March 16, 1909.

Application filed February 1, 1907. Serial No. 355,179.

*To all whom it may concern:*

Be it known that I, HERBERT H. FREY, a citizen of the United States, and resident of Boston, county of Suffolk, State of Massachusetts, have invented an Improvement in Antiskidding Tire Attachments for Wheels, of which the following description, in connection with the accompanying drawing, is a specification, like letters on the drawing representing like parts.

It is well known that the ties of automobiles are commonly loaded with cross chains connected by long side chains that encircle the wheel between the tread and the tire, the side chains anchoring the ends of the cross chains and serving to space the chains the desired distance apart, all the side and cross chains being applied to or removed from a tire at one and the same operation.

I have aimed to provide a series of independent cross chains each of which is provided with an attaching member that may be made to embrace the spoke of the wheel, thus making it possible to employ any desired number of cross chains and to apply them readily when the road demands, or remove the same quickly.

My invention therefore comprehends a tire attachment comprising a cross chain having combined with it an attaching member that may be made to engage any spoke of a wheel.

Figure 1 shows an automobile wheel and its tire, the wheel having applied to it one of my cross chains; Fig. 2 shows my cross chain device detached and enlarged; and Fig. 3 shows one of the endmost links of the chain.

The wheel A, hub A', spokes A² and tire B are and may be of any usual construction.

My tire attachment D comprises a short chain $d$ of a sufficient length to partially embrace the tire, and an attaching member E preferably flexible and non-metallic, the body of the attaching member being shown as a piece of cord, the ends of which are provided with engaging members $e$ shown as hooks so constructed as to enable the end links of the chain to be coupled with said hooks. The hooks shown have an open throat $e'$ preferably a little narrower than the diameter of the wire used in making the chain links, and to enable the endmost links of the chain to be engaged with said hooks I preferably flatten one end of each endmost link, as shown at $d'$, Fig. 3, so that only that part of the link may enter the hook.

To apply the attaching device I knot the member E, as shown at $e^3$, see Fig. 1, about the spoke where it meets the rim of the wheel, and as the wheel is run over the ground the backward drag of the chain turns or twists it on the tire and soon sets the knot snugly about the tire so that it will not further move as the wheel is used, the close setting of the knot preventing the slipping of the cord on the spoke which might otherwise wear off the paint of the spoke.

Having fully described my invention, what I claim as new and desire to secure by Letters Patent is:—

An anti-skidding attachment for wheels comprising a flexible cord adapted to be wound and knotted about a spoke, a hook attached to each end of the cord and having an open, contracted throat, and a chain to cross the tire and adapted to be connected at its ends with the hooks, the endmost links of the chain having a portion reduced in thickness to enter the contracted throats of the hooks.

In testimony whereof, I have signed my name to this specification, in the presence of two subscribing witnesses.

HERBERT H. FREY.

Witnesses:
   GEO. W. GREGORY,
   EVANGELINE C. BROWN.